United States Patent [19]

Schwabegger et al.

[11] Patent Number: 5,437,776
[45] Date of Patent: Aug. 1, 1995

[54] PROCESS FOR REDUCING THE PHOSPHORUS CONTENT OF WASTE WATER

[76] Inventors: Johann Schwabegger, Friensdorf 24, Wartberg/Aist, Austria, A-4224; Rudolf Lumetzberger, Sandleiten 13, Pregarten, Austria, A-4230

[21] Appl. No.: 204,139
[22] PCT Filed: Jun. 30, 1993
[86] PCT No.: PCT/AT93/00110
§ 371 Date: Feb. 25, 1994
§ 102(e) Date: Feb. 25, 1994
[87] PCT Pub. No.: WO94/00388
PCT Pub. Date: Jan. 6, 1994

[30] Foreign Application Priority Data

Jun. 30, 1992 [AT] Austria ................ 1328/92

[51] Int. Cl.$^6$ ........................... C02F 1/461
[52] U.S. Cl. ................... 204/149; 204/152; 204/130
[58] Field of Search ............. 204/149, 152, 130

[56] References Cited

U.S. PATENT DOCUMENTS 3,971,707 7/1976 Deshpande ............... 204/149
4,204,925 5/1980 Coll-Palagos ............. 204/152

FOREIGN PATENT DOCUMENTS 52-109757 9/1977 Japan .
57-107289 7/1982 Japan .
63137795 11/1986 Japan .
2011472 7/1979 United Kingdom .

OTHER PUBLICATIONS

English Language Dialog Abstract of JP 63-137795 Nov. 1986.
English Language Dialog Abstract of JP 52-109757 Sep. 1977.
English Language Dialog Abstract of JP 57-107289 Jul. 1982.

*Primary Examiner*—John Niebling
*Assistant Examiner*—Arun S. Phasge
*Attorney, Agent, or Firm*—Brumbaugh Graves Donohue & Raymond

[57] ABSTRACT

According to a process for lowering the phosphorus content of waste water, the waste water flows in a purification circuit through individual conditioning basins, such as a preliminary sedimentation basin, an activation basin, final sedimentation basin or the like. In order to reduce the phosphorus content in a rational, ecological and efficient manner, the waste water is subjected to an electrolysis in one of the conditioning basins, preferably in the activation basin, by means of metal electrodes and of an electric direct voltage.

8 Claims, 1 Drawing Sheet

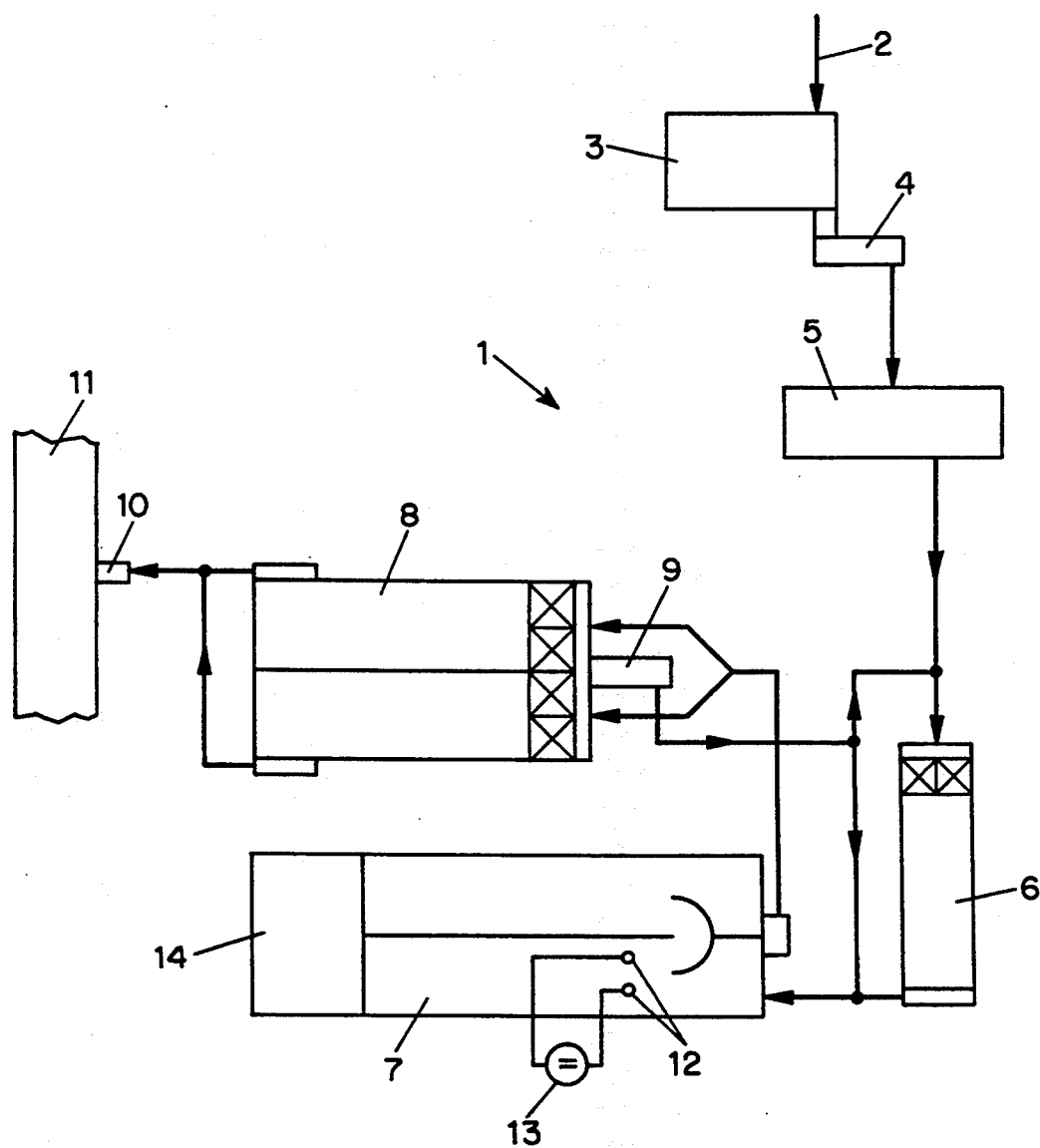

PROCESS FOR REDUCING THE PHOSPHORUS CONTENT OF WASTE WATER

The invention relates to a process for reducing the phosphorus content of waste water, which is conducted in a purification cycle through individual treatment tanks, such as preliminary treatment tanks, activation tanks, final sedimentation tanks, or the like.

The phosphorus and nitrogen content of the waste water supplies the nutrient basis for an often uncontrolled algal bloom, so that in any waste water treatment great attention has to be paid to reducing the phosphorus content, since precipitation of the phosphorus from the waste water provides a practical possibility to influence the formation of algae in the natural water bodies. So far, phosphorus and phosphates have been precipitated from the waste water by addition of chemical precipitating agents, such as iron salts or lime, this process however on the one hand causes high costs for the chemicals and on the other hand additionally pollutes the water with the chemicals.

Therefore it is the objective of the invention to remove these shortcomings and to provide a process of the kind mentioned above, which in an economical and also especially effective way allows a decisive reduction of the phosphorus content of the waste water, rendering superfluous to a great extent the addition of chemicals for phosphorus precipitation.

The invention achieves this objective by subjecting the waste water in one of the treatment tanks, preferably in the activation tank, to electrolysis, by means of metal electrodes and an electric direct voltage. The building up of an electric field in the waste water leads to chemical changes due to the electrode reactions and ion migration, which involve a surprisingly strong phosphorus precipitation, the phosphorus being enriched in the sludge and then withdrawn with the excess sludge from the purification cycle. The remaining residual part of the phosphorus is decomposed preferably biologically by microorganisms in the activation tank, so that a reduction of the phosphorus content of the waste water to a desired extent in a non-polluting way, without addition of chemicals, can be guaranteed.

Thus for example, in a sewage treatment plant for about 10,000 population equivalences, electrolysis was performed in the activation tank by means of two tubular electrodes of stainless steel (V4A) connected to a 24 V direct current supplying terminal, which have a length of about 180 cm and a diameter of about 15 cm and which immerse into the waste water with a mutual distance of about 50 cm, providing an approximately 90–95% reduction of the phosphorus content to a level clearly below the legally established limits without addition of precipitating agents, the electrodes having to be replaced after an endurance of some weeks.

FIG. 1 is a block diagram illustrating an embodiment of the invention.

In FIG. 1 an embodiment of the invention is illustrated in more detail.

In a sewage treatment plant 1, the waste water is subjected to a purification cycle, being conducted through an admission 2, a rain tank 3, an admission spiral pump 4, a raking and sandcatching device 5, a preliminary sedimentation tank 6, an activation tank 7 and a final sedimentation tank 8. A return sludge spiral pump 9 returns the sludge from the final sedimentation tank 8 partially before and partially after the preliminary sedimentation tank 6 back to the purification cycle, and the treated water flows from the final sedimentation tank 8 through the discharge 10 into a draining ditch 11. In the activation tank 7, metal electrodes 12, which are connected to a direct current supply terminal 13, immerse into the waste water, allowing an electric field to build up.

The waste water fed into the sewage treatment plant 1 reaches, after the mecanical purification by a raking and sandcatching device 5, the preliminary sedimentation tank 6, where denitrification takes place and most of the suspended matter settles. This primary sludge is withdrawn together with the excess sludge returned to the cycle from the final sedimentation tank 8, from the preliminary sedimentation tank 6 and further treated in thickeners and digestion towers not represented. The mecanically purified and denitrified waste water flows from the preliminary sedimentation tank 6 into the activation tank 7, where it is subjected to electrolysis via the direct voltage-carrying metal electrodes 12, which in a rational and efficient way leads to a precipitation of phosphorus. The residual part of the phosphorus and organic matter still contained are further reduced by microorganisms in the activation tank 7, special aeration devices 14 providing the appropiate oxygen supply. The sludge-water mixture discharged from the activation tank 7 is conducted to the final sedimentation tank 8, in which the residual sludge settles, and the waste water now also biologically purified flows from the final sedimentation tank 8 via the discharge 10 into the draining ditch 11. The sludge from the final sedimentation tank 8 is returned via the return sludge spiral pumps 9 each half to the preliminary sedimentation tank 6 and the activation tank 7, thus being closed the sludge cycle and attained the desired degree of purification. The excess sludge ist withdrawn, as mentioned above, together with the primary sludge from the preliminary sedimentation tank 6.

Electrolysis in the process according to the invention has to be performed only in a single step. Despite of single step operation, a separation efficiency in excess of 90% can be achieved.

It has proven extraordinarily efficient to perform electrolysis in the activation tank. In this tank, there occur simultaneously biological processes which also favour a phosphate separation. This embodiment of the process according to the invention is based on the finding that electrolytical and biological processes for phosphate separation synergistically influence each other, leading to an intensified phosphate separation. When performing the electrolysis in the activation tank, the temperature of the activated sludge should not be too high, in order not to destroy the bacteria present. It has shown that the process according to the invention allows precipitations of phosphate in excess of 90% even at ambient temperatures. In this embodiment of the process according to the invention it is possible to practice electrolysis with a current density of less than 0,05 A/dm$^2$ of electrode surface at a voltage of about 24 volt. Thus the process according to the invention requires an extremely low electric power consumption.

The temperature of the activated sludge (mixture of the discharge from the preliminary sedimentation tank 6 and return sludge from the final sedimentation tank 8) in the activation tank 7 should be below 45° C. External heating of the activated sludge in the activation tank 7 to temperatures above 40° C is not necessary. Usually the activated sludge flows from the preliminary sedimentation tank 6 with a temperature in the range of about 4° C. (in winter) up to 25° C. (in summer).

It has shown that the phosphorus precipitation according to the invention works especially well when the phosphorus present in the waste water is orthophosphate.

Another embodiment of the precipitation process according to the invention consists in providing the bottom and/or sides of the activation tank electrically conductive as a cathode, and providing merely the anode as the only electrode in the activated sludge.

With the following example, the invention will be described in greater detail:

EXAMPLE

An embodiment of a sewage treatment plant shown in the figure was used.

The admission of liquid to be cleared to the preliminary sedimentation tank 6 was 33 m$^3$ of waste water per hour. The waste water had a pH of 7,5, a chemical oxygen demand (COD) of 600 and 8 mg of $PO_4^{3-}$-phosphorus per liter. In the preliminary sedimentation tank 6, denitrification took place, and primary sludge generated was withdrawn from the cycle together with returned excess sludge. From the preliminary sedimentation tank 6, sludge water, mixed with return sludge from the final sedimentation tank 8, flowed as activated sludge with a solid content of 5,5 g per liter and with 10 mg of $PO_4^{3-}$-phosphorus per liter to the activation tank 8. In this activated sludge (25° C.) a cathode and anode both made of iron having an electrode surface of 0,5 m$^2$ each were immersed. Electrolysis was performed at a voltage of 24 V and a current intensity of 1,3 A. The sludge/water mixture obtained (electrolytically treated activated sludge) was withdrawn from the activation tank and conducted to the final sedimentation tank for settling. In the final sedimentation tank, the phosphate-containing sludge separated, being mixed afterwards by the spiral pump at about 50% to the preliminary sedimentation tank and the residual part to the sludge/water mixture from the preliminary sedimentation tank which flowed into the activation tank.

The cleared waste water contained 0,5 mg of $PO_4^{3-}$-phosphorus per liter. The COD was 37. The purified waste water was conducted into the draining ditch.

We claim:

1. A process for reducing the phosphate content in waste water, which is conducted in a purification cycle through individual treatment tanks, selected from the group consisting of preliminary sedimentation tanks, activation tanks, and final sedimentation tanks comprising the steps of:
    providing microorganisms which decompose phosphates in one of said treatment tanks; and
    simultaneously subjecting the waste water to electrolysis in said one treatment tank to precipitate phosphates.

2. The process according to claim 1 wherein said one treatment tank is an activation tank.

3. The process according to claim 1, wherein the electrolysis is performed in a single step.

4. The process according to claim 1, wherein the electrolysis is performed by means of metal electrodes and a direct current voltage.

5. The process according to claim 1 wherein the temperature of the contents of said one treatment tank is maintained at less than 45° C.

6. The process according to claim 1, wherein no chemical agents are added to the contents of said one treatment tank.

7. The process according to claim 1, 2, 3, 4, 5, or 6, wherein the electrolysis is effected by means of a pair of electrodes and further comprising the step of maintaining a current density at the electrodes of less than 0.05 A/dm$^2$ of electrode surface during the electrolysis of the waste water.

8. The process according to claim 7, wherein one of the electrodes is a portion of said one treatment tank functioning as a cathode and wherein the electrolysis comprises subjecting the waste water to electrolysis between the cathode and the other electrode.

* * * * *